G. S. HARRIS.
LOCK WASHER.
APPLICATION FILED MAY 1, 1911.
1,003,602.
Patented Sept. 19, 1911.
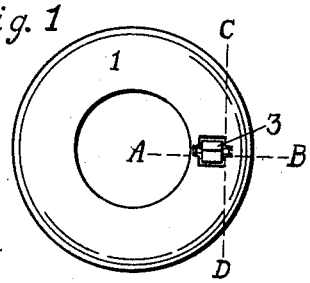
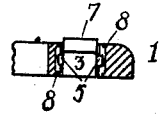
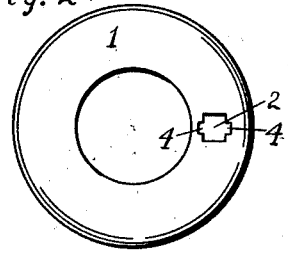
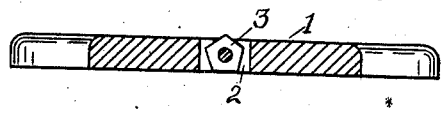
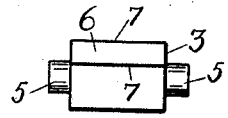
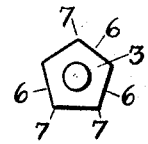
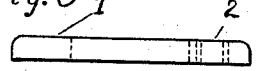
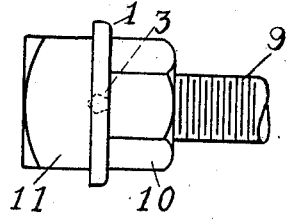
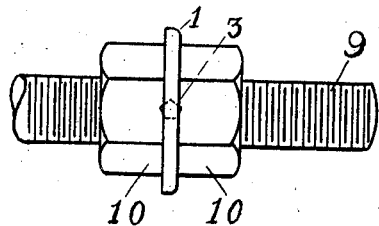
WITNESSES
INVENTOR
George S. Harris.
BY
ATTORNEY

UNITED STATES PATENT OFFICE.

GEORGE S. HARRIS, OF PITTSFIELD, MASSACHUSETTS.

LOCK-WASHER.

1,003,602.  Specification of Letters Patent.  Patented Sept. 19, 1911.

Application filed May 1, 1911. Serial No. 624,386.

*To all whom it may concern:*

Be it known that I, GEORGE S. HARRIS, a citizen of the United States, residing at Pittsfield, in the county of Berkshire and State of Massachusetts, have invented certain new and useful Improvements in Lock-Washers, of which the following is a specification.

My present invention concerns a washer adapted to fix in a given relation opposing elements provided on a threaded stem, at least one of which elements is rotatable relatively to the other.

The principal object of the invention is to provide a yielding locking device adapted to prevent reverse movement of the nut or other movable element due to vibration, or other causes having less force than the power required to screw said element into place.

The invention essentially consists of a washer-plate having an opening through its body-portion and a rotatable member having a minimum diameter greater than the thickness of the plate and movably secured in the opening, said member being so disposed in the plane of the plate that movement of the nut or other tightening element will tend to rotate the same. It will be understood, however, that the term washer is herein employed in its generic sense and includes any strip of metal, or other suitable substance, having a bolt-hole therein, without regard to the form of its outline.

In the use of nut locks and other devices of the same general class heretofore designed it is usually required that a nut of a special construction or spring means (including resilient plates) be employed in conjunction with the device. In my present invention, however, I avoid these objections, as any usual form of nut may be used in connection therewith and no spring means are required to hold the nut in position.

Referring to the accompanying drawings, wherein I have shown a specific useful form of embodiment of my invention, Figure 1 is a face view of a washer constructed according to my invention; Fig. 2, a face view of the washer-plate; Fig. 3, an edge view of the same; Fig. 4, a detail vertical section on the line A—B of Fig. 1; Fig. 5, a similar view on the line C—D of Fig. 1; Fig. 6, a side view of the roller on an enlarged scale; Fig. 7, an end view of the same; Fig. 8, an assembly view showing the washer interposed between a bolt-head or fixed element and a nut or rotary element, and Fig. 9, a similar view showing the washer interposed between two nuts, the relative position of the roller being illustrated in the last two views.

One part of my invention concerns the washer-plate 1, which is shown as a flat ring of uniform thickness and having concentric sides. Said plate is preferably constructed of metal and provided with even wearing faces, but I do not limit myself to any particular material, form or dimensions. At a point in the body of the plate, preferably approximate the inner side thereof, I provide a transverse opening 2, extending through the plate, of sufficient size to receive for free rotary movement therein a rotatable member, represented by the roller 3, the opposite sides of the opening which form the bearing edges being provided with transverse guide-ways or slots 4, 4, for the reception of the journals 5, 5, preferably provided on the member 3, said journals being free to move in the slots 4, 4, transversely of the plate 1 and preferably laterally also to a limited extent, the object being to construct the opening 2 and slots 4, 4, of a proper size for the reception and guidance of the roller without normally binding thereon. While said opening 2 may be formed as a mere recess in one of the faces of the plate without extending therethrough, thereby limiting the engagement of said member 3 to one of the opposing elements bearing upon the washer, I prefer to extend the opening 2 through the plate as described, whereby each of the said opposing elements is engaged by the rotatable member.

The remaining portion of my device concerns the rotatable member 3, which is preferably constructed of highly tempered steel calculated to be harder than either of the opposing elements. Said member 3 is herein shown in the form of a roller, having a minimum diameter greater than the thickness of the plate 1 and is peripherally provided with a plurality of intercepting flat faces 6, 6, etc., in the form of a polyhedron, the adjacent faces intercepting in lines forming incision edges 7, 7, etc., which severally extend in the course of the revolution of the roller through the opening 2 and beyond the surface of the plate on each side thereof successively. As I prefer to construct said roller in the form of a regular pentagon in cross section, whereby each of the edges 7 is opposite one of the faces 6, it will be apparent that at least one of the edges 7 will extend beyond the surface of the plate on one side or the other at any given position of the roller.

When mounted in position in the opening 2, the member 3 is preferably secured in position by slightly burring the plate 1 at opposite ends of the slots 4, 4, as shown at 8, which serves to limit the transverse movement of the journals 4, 4, and to prevent total displacement of the roller 3. While said rotatable member and opening in the plate may be differently formed or constructed than in the manner herein described and shown, it is essential to the embodiment of the principles of my invention that such member be rotatable and adapted to project beyond the surface of the plate.

In operation, the washer is usually mounted upon a threaded rod 9, and interposed between opposing elements, which are herein shown as movable nuts 10, 10, and as a nut 10 and bolt-head 11. It is essential, however, to the operation of the device that at least one of said opposing elements should be rotatively movable. Such movable element is screwed down to its limit of movement, causing the opposite faces of the plate 1 to be tightly engaged by the corresponding opposing elements. The pressure thus exerted upon the roller 3 causes the projecting edge or edges 7 to wedge into the face of the engaging nut. The process of tightening the nut after first engagement with the roller causes the latter to rotate with the nut, resulting in the registration of a series of notches on the faces of the opposing elements, such notches being usually attended with raised edges due to displacement of the metal, and as the tightening process continues these edges are forced back into the corresponding notches by the pressure of the plate 1, thus partially closing the notches and offering obstruction to the reverse movement of the roller and nut. Hence, when the tightening process has been discontinued and the nut finally comes to rest in a given position, reverse action of the nut due to vibration or other relatively slight forces is made practically impossible, as the edges of the roller during reverse action must be freshly wedged into the opposing elements. Moreover, the reverse movement of the nut is further impeded by the fact that as the roller is shown to be held loosely in the opening 2, some lateral displacement is given to the roller by the rotation of the nut in tightening, causing the roller journals to bind slightly on the guide-ways 4, 4, and affecting the regularity of the notches produced as described. This displacement of the roller must be corrected upon reverse movement of the nut, which causes a slight variation in the relative position of the new notches formed on the nut.

It will be understood that while I have preferred to illustrate the rotatable member 3 in the form of a roller having flat faces, such member as a whole or the periphery thereof may be otherwise formed without departing from the spirit and purpose of my invention.

I claim:

1. A device of the character described, comprising a plate having an opening therethrough, a rotatable member disposed in said opening and journaled in the plate and having a minimum diameter greater than the thickness of the plate, said member being adapted to make a complete revolution on its axis.

2. A lock-washer comprising a plate adapted to be carried on a bolt and interposed between opposing elements, at least one of said elements being rotatable relatively to the other, said plate having a transverse opening therethrough and a rotatable member carried in said opening and having a minimum diameter greater than the thickness of the plate, said member being adapted to offer a yielding resistance to the action of the rotatable element and to make a complete revolution on its axis.

3. A washer having a transverse opening therethrough and a polyhedral roller carried in the opening and journaled in the body of the washer, the adjacent peripheral faces of the roller intercepting each other in lines adapted to project beyond the surface of the washer during the revolution of the roller.

In testimony wherof I hereto affix my signature in presence of two witnesses.

GEORGE S. HARRIS.

Witnesses:
 JNO. J. WHITTLESEY,
 WILLIAM E. BAGG.